United States Patent
Chen et al.

(10) Patent No.: US 12,477,430 B2
(45) Date of Patent: Nov. 18, 2025

(54) RADIO (NR) HANDOVER, RADIO LINK MONITORING (RLM), BEAM FAILURE DETECTION (BFD), AND CANDIDATE BEAM DETECTION (CBD) WITH CLEAR CHANNEL ASSESSMENT (CCA)

(71) Applicant: Apple Inc., Cupertino, CA (US)

(72) Inventors: Xiang Chen, Campbell, CA (US); Dawei Zhang, Saratoga, CA (US); Huaning Niu, San Jose, CA (US); Jie Cui, San Jose, CA (US); Manasa Raghavan, Sunnyvale, CA (US); Qiming Li, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/958,048

(22) Filed: Sep. 30, 2022

(65) Prior Publication Data

US 2023/0217339 A1 Jul. 6, 2023

Related U.S. Application Data

(60) Provisional application No. 63/295,143, filed on Dec. 30, 2021.

(51) Int. Cl.
*H04W 36/38* (2009.01)
*H04W 36/30* (2009.01)
*H04W 56/00* (2009.01)

(52) U.S. Cl.
CPC ......... *H04W 36/305* (2018.08); *H04W 36/38* (2013.01); *H04W 56/004* (2013.01)

(58) Field of Classification Search
None
See application file for complete search history.

(56) References Cited

U.S. PATENT DOCUMENTS 10,064,109 B2 8/2018 Chapman et al.
2020/0154333 A1* 5/2020 Paladugu ............. H04B 7/0452
(Continued)

FOREIGN PATENT DOCUMENTS

CN 106416363 A 2/2017

OTHER PUBLICATIONS

3GPP, "Technical Specification Group Radio Access Network; 5G; NR; Requirements for support of radio resource management (Release 15)," 3GPP TS 38.133 V15.3.0 (Oct. 2018), 5G, 134 pages.
(Continued)

*Primary Examiner* — Anez C Ebrahim
(74) *Attorney, Agent, or Firm* — STERNE, KESSLER, GOLDSTEIN & FOX P.L.L.C.

(57) ABSTRACT

Some aspects relate to apparatuses and methods for implementing mechanisms for performing handover, radio link monitoring (RLM), beam failure detection (BFD), and candidate beam detection (CBD) within the unlicensed spectrum when a listen-before-talk (LBT) failure occurs and/or when a user equipment (UE) performs receiving (RX) beam sweeping. For example, a UE is configured to receive a handover command to connect to a target cell. The UE is further configured to determine a search time and an interruption time uncertainty during a handover procedure initiated by the handover command and in response to a LBT failure or the UE performing a beam sweeping operation. The UE can further determine a handover delay based on the search time and the interruption time uncertainty. In response to a time period for performing the handover procedure exceeding the handover delay, the UE can cease the handover procedure.

20 Claims, 5 Drawing Sheets

(56) References Cited

U.S. PATENT DOCUMENTS

| | | |
|---|---|---|
| 2021/0022058 A1 | 1/2021 | Islam et al. |
| 2021/0219144 A1* | 7/2021 | Schwengler .......... H04L 5/0048 |
| 2024/0188010 A1* | 6/2024 | Makino ............... H04W 56/001 |

OTHER PUBLICATIONS

3GPP, "Technical Specification Group Radio Access Network; 5G; NR; Requirements for support of radio resource management (Release 16)," 3GPP TS 38.133 V16.4.0 (Aug. 2020), 5G, 1465 pages.

Nokia, Nokia Shanghai Bell, "CR to TS 36.133: adding handover to NR-U," 3GPP TSG-RAN WG4 Meeting #95-e, Electronic Meeting, May 25-Jun. 5, 2020, R4-2008559; 4 pages.

3GPP TS 38.213 V16.7.0 (Sep. 2021), 3rd Generation Partnership Project; Technical Specification Group Radio Access Network; NR; Physical layer procedures for control (Release 16); 188 pages.

3GPP TS 38.331 V16.7.0 (Dec. 2021), 3rd Generation Partnership Project; Technical Specification Group Radio Access Network; NR; Radio Resource Control (RRC) protocol specification (Release 16); 963 pages.

\* cited by examiner

RADIO (NR) HANDOVER, RADIO LINK MONITORING (RLM), BEAM FAILURE DETECTION (BFD), AND CANDIDATE BEAM DETECTION (CBD) WITH CLEAR CHANNEL ASSESSMENT (CCA)

CROSS-REFERENCE TO RELATED APPLICATIONS

The present application claims the benefit of U.S. Provisional Patent Application No. 63/295,143, filed on Dec. 30, 2021, which is hereby incorporated by reference in its entirety.

BACKGROUND

Field

The described aspects generally relate to wireless communication in unlicensed spectrum.

Related Art

Unlicensed spectrum plays an important role in the current wireless communication technology. For example, the fifth generation (5G) new radio (NR) in unlicensed spectrum (NR-U) provides the technology for cellular operators to integrate the unlicensed spectrum into 5G networks. NR-U enables both uplink and downlink operations in unlicensed bands, supporting new features such as wideband carriers.

The current NR operation is being extended to 71 GHz spectrum to cover the spectrum from 52.6 GHz to 71 GHz. In this spectrum band, channel access in both downlink and uplink may rely on a listen-before-talk (LBT) feature. A wireless device or a base station may first "sense" the communication channel in the unlicensed spectrum to be "free" prior to any transmission. Also, this spectrum band can be designated as part of frequency range 2 (FR2).

SUMMARY

Some aspects of this disclosure relate to apparatuses and methods for implementing mechanisms for performing handover, radio link monitoring (RLM), beam failure detection (BFD), and candidate beam detection (CBD) within the unlicensed spectrum when an LBT failure occurs and/or when a user equipment (UE) performs receiving (RX) beam sweeping. For example, some aspects of this disclosure provide a handover interruption time as part of a handover delay to be used by the UE for performing handover in the unlicensed spectrum when an LBT failure occurs and/or when the UE is to perform RX beam sweeping. Additionally, some aspects of this disclosure provide evaluation times be used by the UE for performing RLM, BFD, and/or CBD when an LBT failure occurs and/or when the UE is to perform RX beam sweeping.

Some aspects of this disclosure relate to a user equipment (UE). The UE includes a transceiver configured to wirelessly communicate with a serving cell and includes a processor communicatively coupled to the transceiver. The processor is configured to receive, using the transceiver, a handover command to connect to a target cell and initiate a handover procedure responsive to the handover command. The processor is further configured to determine a search time and an interruption time uncertainty during the handover procedure initiated by the handover command and in response to a listen-before-talk (LBT) failure or the UE performing a beam sweeping operation. The processor can further determine a handover delay based on the search time and the interruption time uncertainty. In response to a time period for performing the handover procedure exceeding the handover delay, the processor can cease the handover procedure.

In some aspects, the processor is further configured to reestablish a connection with the serving cell or establish a connection with the target cell or a third cell in response to the time period for performing the handover procedure exceeding the handover delay.

In some aspects, the processor is further configured to determine the search time based at least on (1) a number of synchronization signal blocks (SSB) based measurement timing configuration (SMTC) occasions being unavailable or (2) a number of SMTC occasions on which the UE did not detect any SSB during an intra-frequency detection period or an inter-frequency detection period.

In some aspects, the processor is further configured to determine the interruption time uncertainty based on (1) a number of consecutive synchronization signal blocks (SSBs) to physical random access channel (PRACH) occasion association periods during which no PRACH occasion is available for PRACH transmission or (2) a number of consecutive PRACH occasions during which the UE cannot do PRACH transmission.

In some aspects, the processor is further configured to compare a time period between two successful SSB measurements and/or detections, which are closest in time domain, to a time threshold and in response to the time period exceeding the time threshold, reset the search time and re-determine the search time. According to some aspects, the UE will have successful SSB measurements and/or detections when a base station (BS) transmits an SSB and BS SSB TX beam and UE RX beam are aligned.

In some aspects, the processor is further configured to determine an evaluation time period for radio link monitoring (RLM) based on the LBT failure or the UE performing the beam sweeping operation and use the evaluation time period for an RLM operation. The processor can also be configured to compare the time period between two successful SSB or CSI-RS (channel state information reference signal) measurements and/or detections, which are closest in time domain, to a threshold and in response to the time period exceeding the threshold, reset the evaluation time period and re-determine the evaluation time period.

In some aspects, the processor is further configured to determine an evaluation time period for Beam Failure Detection (BFD) based on the LBT failure or the UE performing the beam sweeping operation and use the evaluation time period for a BFD operation. The processor can further be configured to compare the time period between two successful SSB or CSI-RS measurements and/or detections, which are closest in time domain, to a threshold and in response to the time period exceeding the threshold, reset the evaluation time period and re-determine the evaluation time period.

In some aspects, the processor is further configured to determine an evaluation time period for Candidate Beam Detection (CBD) based on the LBT failure or the UE performing the beam sweeping operation and use the evaluation time period for a CBD operation. The processor can further be configured to compare the time period between two successful SSB or CSI-RS measurements and/or detections, which are closest in time domain, to a threshold and in response to the time period exceeding the threshold, reset the evaluation time period and re-determine the evaluation time period.

In some aspects, transceiver is configured to operate on an unlicensed spectrum as part of frequency range 2 (FR2) in a 52.6 GHz to 71 GHz spectrum.

Some aspects of this disclosure relate to a method including receiving, by a user equipment (UE), a handover command to connect to a target cell and initiating a handover procedure responsive to the handover command. The method further includes, in response to a listen-before-talk (LBT) failure or the UE performing a beam sweeping operation during a handover procedure initiated, determining a search time and an interruption time uncertainty. The method also includes determining a handover delay based on the search time and the interruption time uncertainty. In response to a time period for performing the handover procedure exceeding the handover delay, the method includes ceasing the handover procedure.

Some aspects of this disclosure relate to a non-transitory computer-readable medium storing instructions. When the instructions are executed by a processor of a user equipment (UE), the instructions cause the processor to perform operations including receiving a handover command to connect to a target cell and initiating a handover procedure responsive to the handover command. The operations further include, in response to a listen-before-talk (LBT) failure or the UE performing a beam sweeping operation during the handover procedure, determining a search time and an interruption time uncertainty. The operations also include determining a handover delay based on the search time and the interruption time uncertainty. In response to a time period for performing the handover procedure exceeding the handover delay, the method includes ceasing the handover procedure or continue the handover procedure until a corresponding handover timer (e.g., T304) expires.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
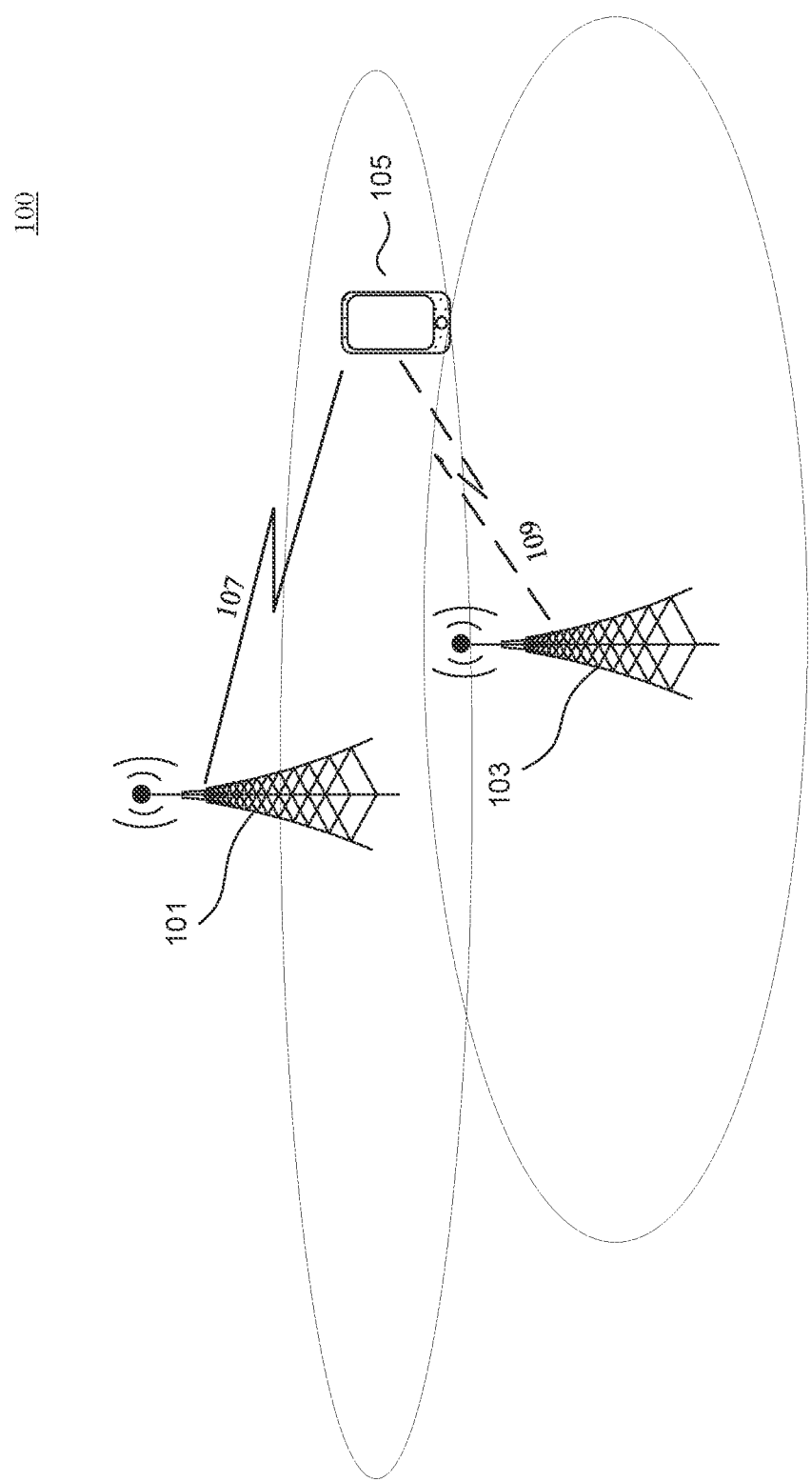
FIG. 1 illustrates an example system implementing mechanisms for performing handover, RLM, BFD, and CBD within the unlicensed spectrum when an LBT failure occurs and/or when a UE performs RX beam sweeping, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In unlicensed spectrum, the LBT mechanism can be performed by the UE using a sensing beam to sense the channel occupancy by a clear channel assessment (CCA) check before utilizing the channel. A sensing beam of a UE may refer to an antenna beam (herein "beam") of the UE used for sensing the channel occupancy. CCA uses energy detection (ED) to detect the presence (e.g., channel is busy) or absence (e.g., channel is free) of other signals on the channel. If the detected energy during an initial CCA period is lower than a certain threshold, the channel is deemed to be free, and the device can utilize the channel for a period called channel occupancy time (COT). On the other hand, when the detected energy during an initial CCA period is higher than the threshold, the channel is deemed to be busy, and the device cannot utilize the channel. In addition to, or in alternative to, the UE, a base station (for example, an evolved Node B (eNB), a next generation Node B (gNB), etc.) can also perform the LBT mechanism using CCA before utilizing the channel.

The base station can use transmission (TX) beam sweeping for transmitting data, control information, or the like to the UE. The base station can use different beams at different directions to transmit, for example, synchronization signal blocks (SSB) to the UE. Similarly, the UE can use RX beam sweeping to determine and detect a beam (and/or one or more SSBs) from the base station.

If the LBT mechanism performed by the UE fails (e.g., the UE determines that a sensed channel is busy), then the UE cannot transmit in the uplink. Additionally, or alternatively, if the LBT mechanism performed by the base station fails (e.g., the base station determine that a sensed channel is busy), then the base station cannot transmit the SSB(s) to the UE and therefore, the UE cannot detect the SSB(s). Additionally, if a RX beam of the UE is not aligned with a TX beam of the base station (e.g., a TX beam that transmits the SSB(s)), then the UE cannot successfully detect the SSB(s).

Some aspects of this disclosure relate to apparatuses and methods for implementing mechanisms for performing handover, radio link monitoring (RLM), beam failure detection (BFD), and candidate beam detection (CBD) within the unlicensed spectrum when the LBT failure occurs and/or when the UE performs RX beam sweeping (because of, for example, beam misalignment).

FIG. 1 illustrates an example system 100 implementing mechanisms for performing handover, RLM, BFD, and CBD within the unlicensed spectrum when an LBT failure occurs and/or when a UE performs RX beam sweeping, according to some aspects of the disclosure. Example system 100 is provided for the purpose of illustration only and does not limit the disclosed aspects.

System 100 may include, but is not limited to, network nodes (for example, base stations such as eNBs, gNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 17 (Rel-17) or another 3GPP standard. UE 105 can include, but is not limited to: wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations or cells) can include nodes configured to operate based on a wide variety of wireless communication techniques such as, but not limited to, techniques based on 3GPP standards. For example, base stations 101 and 103 can include nodes configured to operate using Rel-17 or another 3GPP standard.

According to some aspects, UE 105 and base stations 101 and 103 are configured to implement mechanisms for triggering UE 105 to perform handover procedures. For example, UE 105 can be connected to and communicate with base station 101 (e.g., a serving cell). If one or more conditions are satisfied, UE 105 can perform hand over operations to connect to and communicate with base station 103 (e.g., a target cell). In some examples, the handover procedures can include a UE initiated handover or a network initiated handover. Additionally, or alternatively, the handover procedures can include an intra-frequency handover (e.g., UE 105 remains on the same channel when it moves to the target cell) or an inter-frequency handover (e.g., UE 105 uses a different channel when it moves to the target cell). The aspects of this disclosure can be used with any type of handover procedure.

In one example of inter-frequency handover and/or intra-frequency handover, base station 101 can initiate the handover. For example, base station 101 can send a handover request to base station 103. Base station 103 can perform admission control and transmit a handover acknowledgment to base station 101. The handover acknowledgment can include a radio resource control (RRC) configuration. In response to the handover acknowledgment, base station 101 can send a handover command to UE 105. The handover command can include the RRC configuration. Additionally, or alternatively, the handover command can include information associated with base station 103 (e.g., cell identifier (ID), or the like) that UE 105 can use to access and connect to base station 103. UE 105 can use the handover command from base station 101 to switch to base station 103. After the switch, UE 105 can send a handover complete message to target base station 103.

In one example of network initiated handover, UE 105 can receive handover information from base station 101. For example, UE 105 can receive a measurement configuration for handover from base station 101. In response, UE 105 can perform quality measurements on, for example but not limited to, beam reference signals from neighbor cells. After performing the measurements, UE 105 can send a measurement report to base station 101. The measurement report can include quality measurements for different neighbor cells. Based on the measurement report, base station 101 can determine a target cell (e.g., base station 103). In some examples, base station 101 can communicate with base station 103 as discussed above to send handover request and receive handover acknowledgment. Additionally, or alternatively, base station 101 can send a handover command to UE 105. The handover command can include RRC connection reconfiguration along with information associated with base station 103. UE 105 can use the handover command from base station 101 to switch to base station 103. After the switch, UE 105 can send a handover complete message to target base station 103, which can include RRC connection reconfiguration complete.

In one example of UE initiated handover, UE 105 can receive handover information from base station 101. For example, UE 105 can receive the measurement configuration for handover from base station 101. In response, UE 105 can perform quality measurements on, for example but not limited to, beam reference signals from neighbor cells. After performing the measurements, UE 105 can send a measurement report to base station 101. The measurement report can include quality measurements for different neighbor cells. Based on the measurement report, base station 101 can determine a list of possible target cells (including, for example, base station 103). Base station 101 can send the list of possible target cells to UE 105 in, for example, the RRC connection reconfiguration along with information associated with the list of possible target cells. Additionally, or alternatively, base station 101 can provide measurement configuration for UE 105 to complete its handover. From the list of possible target cells, UE 105 can select a target cell (e.g., base station 105). For example, UE 105 can select the target cell (e.g., base station 105) based on the information (e.g., quality measurements) associated the target cell provided by base station 101. After selecting the target cell, UE 105 can switch to the target cell and connect to the target cell. In some examples, UE 105 can use RRC connection reestablishment procedure to connect to the target cell. The RRC connection reestablishment procedure can include random access in the selected cell, RRC connection reestablishment request, RRC connection reestablishment response, and RRC connection reestablishment complete message.

The handover procedures discussed above are provide as examples and do not limit the aspects of this disclosure. The mechanisms of this disclosure for performing handover within the unlicensed spectrum when the LBT failure occurs and/or when the UE performs RX beam sweeping can be applied to any handover procedure.

According to some aspects, UE 105 performs the handover procedure within a handover delay. In some examples, when UE 105 receives (e.g., from base station 101) a RRC message implying handover, UE 105 is to be ready to start the transmission of a new uplink physical random access channel (PRACH) within the handover delay seconds from the end of the last transmission time interval (TTI) containing the RRC command. In some examples, the handover delay can include two component—(1) maximum RRC procedure delay plus (2) and interruption time. In some examples, maximum RRC procedure delay is defined in Technical Specification (TS) 38.331, which is incorporated herein in its entirety. As discussed in more detail below, some aspects of this disclosure are directed to the interruption time when an LBT failure occurs and/or when UE 105 performs RX beam sweeping in FR2 to FR2 handover.

For example, if UE 105 is about to perform the handover procedure (or is performing the handover procedure), UE 105 can determine either an LBT failure at the base station has occurred or RX beam is not aligned with base station TX beam (beam misalignment), when it cannot successfully detect an SSB transmitted by the base station. UE 105 can use the interruption time as disclosed herein to determine the handover delay.

According to some aspects, UE 105 is to perform the handover procedure within the handover delay. If performing the handover procedure takes longer than the handover delay, UE 105 connection with base station 101 could be dropped because of poor link quality before UE 105 is connected to base station 103. Therefore, if performing the handover procedure takes longer than the handover delay, UE 105 is to reestablish its connection with a base station that could be base station 101, or 103, or another base station that is not shown in FIG. 1. For example, UE 105 performs a RRC connection reestablishment procedure to connect with base station 101. Additionally, or alternatively, UE 105 is to find a new cell and establish its connection with the new cell. For example, UE 105 performs a RRC connection setup procedure to connect with the new cell.

According to some aspects, for FR2 to FR2 handover, the interruption time can be defined as $$T_{interruption} = T_{search} + T_{IU} + T_{processing} + T_\Delta + T_{margin} \qquad \text{Equation (1).}$$

Here, $T_{search}$ is the time to search the target cell when the handover command is received by UE 105. Also, $T_{IU}$ is an interruption time uncertainty in acquiring the first available PRACH occasion in a new cell. $T_{processing}$ is time for UE 105 processing. $T_{processing}$ can be up to 20 ms, according to some examples. $T_\Delta$ is time for fine time tracking and acquiring full timing information of the target cell. $T_{margin}$ is time for SSB post-processing for UE 105. In some examples, $T_{margin}$ can be up to 2 ms.

According to some examples, where LBT failure and RX beam sweeping is not considered for determining the interruption time, $T_{search}$ can be 0 ms ($T_{search}=0$ ms) if the target cell (e.g., base station 105) is known. If the target cell is an unknown intra-frequency cell and the target cell has a signal to noise ratio (SNR) such as Ês/Iot is equal to or greater than −2 dB (e.g., Ês/Iot≥−2 dB), then $T_{search}=8*T_{rs}$ ms. If the target cell is an unknown inter-frequency cell and the target cell has an SNR such as Ês/Iot is equal to or greater than −2 dB (e.g., Ês/Iot≥−2 dB), then $T_{search}=8*3*T_{rs}$ ms. In this example, RX beam scanning factor (also referred to as RX beam sweeping factor) is 8. Also, in this example, $T_{rs}$ is the SSB-based measurement timing configuration (SMTC) periodicity of the target cell if UE 105 has been provided with an SMTC configuration for the target cell in the handover command. Otherwise, $T_{rs}$ is the SMTC configured in the measObjectNR having the same SSB frequency and subcarrier spacing. Additionally, in this example, LBT failure and RX beam sweeping is not considered, and $T_{IU}$ can be up to the summation of SSB to PRACH occasion association period and 10 ms.

Some aspects of this disclosure are directed to determining $T_{search}$ and $T_{IU}$ when a LBT failure and/or beam misalignment occurs. As discussed above, when the LBT fails, base station 101 cannot transmit SSB and/or UE 105 cannot detect the SSB. Also, when UE 105 RX beam is not aligned with the SSB transmit beam, UE 105 cannot successfully detect SSB. Considering these conditions, $T_{search}$ and $T_{IU}$ can be defined such that the interruption time ($T_{interruption}$) component of the handover delay can compensate of the delays occurred because of the LBT failure and/or the RX beam sweeping.

According to some aspects where LBT failure and RX beam sweeping is considered for determining the interruption time, $T_{search}$ can be determined using the following options.

Option 1—In this example, for unknown intra-frequency cell:

$$T_{search} = N*(1+SR1\_intra)*Trs \text{ ms} \qquad \text{Equation (2).}$$

For unknown inter-frequency cell:

$$T_{search} = N*(3+SR1\_inter)*T_{rs} \text{ ms} \qquad \text{Equation (3).}$$

Here, N can be the RX beam scanning factor. In some examples, N can be 8 (e.g., for FR2-1). In some examples, N can be greater than 8 (e.g., for FR-2-2). However, the aspects of this disclosure are not limited to these examples and can include other values of N.

SR1_intra and SR1_inter are the number of rounds of RX beam sweeping (e.g., SR=0, 1, 2, . . . ). In this example, N*SR1_intra or N*SR1_inter is the number of SMTC occasions either unavailable, or on which there has been no successful detection of any SSB at UE 105 due to beam misalignment during intra-frequency and inter-frequency detection period, respectively. According to some aspects, within the initial N*1 or N*3 SMTCs, when the first SMTC occasion, denoted by occasion X, becomes unavailable due to the LBT failure and/or beam misalignment, SR1_intra (or SR1_inter) is set to 1. Between occasions X+N and X+2*N−1, if there is one or more SMTC occasions unavailable, the SR1_intra (or SR1_inter) is increased by 1 (i.e., set to 2). This process can continue for additional SMTC occasions that become unavailable.

Option 2—In this example, for unknown intra-frequency cell:

$$T_{search} = (N*T_{rs} + J*L\_intra*T_{rs}) \text{ ms} \qquad \text{Equation (4).}$$

For unknown inter-frequency cell, $$T_{search} = (N*3*T_{rs} + K*L\_inter*T_{rs}) \text{ ms} \qquad \text{Equation (5).}$$

Here, L_intra and L_inter are the number of SMTC occasions not available at UE 105 during intra-frequency and inter-frequency detection period, respectively. Also, J and K are numbers that are no smaller than 1 and no greater than N.

Additionally, or alternatively, when LBT failure and RX beam sweeping is considered for determining the interruption time, $T_{IU}$ can be determined using the following options.

Option 1—In this example:

$$T_{IU} = (1+L1)*T_{SSB,RO} + 10 \text{ ms} \qquad \text{Equation (6).}$$

Here, $T_{SSB,RO}$ is the SSB to PRACH occasion association period. According to some examples, $T_{SSB,RO}$ is defined in Table 8.1-1 of TS 38.213, which is incorporated herein in its entirety. Also, L1 is the number of consecutive SSB to PRACH occasion association periods during which no PRACH occasion is available for PRACH transmission due to an uplink (UL) LBT failure.

Option 2— In this example:

$$T_{IU} = T_{SSB,RO} + L2*\text{SMTC\_periodicity} + 10 \text{ ms} \qquad \text{Equation (7).}$$

Here, $T_{SSB,RO}$ is the SSB to PRACH occasion association period as discussed above. Also, L2 is the number of consecutive PRACH occasion associations during which UE 105 cannot transmit PRACH due to UL LBT failure.

According to some aspects, $T_{interruption}$ can be determined using Equation (1) and using $T_{search}$ from Equations (2), (3), (4), or (5) and $T_{IU}$ from Equations (6) or (7).

According to some aspects, since the search time $T_{search}$ can be long due to one or more LBT failures, one or more beam misalignments (e.g., UE performing RX beam sweeping), or the combination of LBT failure(s) and beam misalignment(s), the time period between two successful SSB measurements and/or detections, which are closest in time domain, can be long at the UE. A time threshold for such a time period can be used. According to some examples, if the time period between a prior successful measurement and a current successful measurement exceeds the time threshold, UE 105 will discard the prior successful measurement (and any successful measurements before that). In other words, if the time period between two closest successful measurements exceeds the time threshold, UE 105 will discard the prior measurements and also, UE 105 resets the search time $T_{search}$ and restarts calculating the search time $T_{search}$. In some examples, the time threshold can be provided in the specifications used by UE 105 and the network (e.g., base stations 101 and 103). Additionally, or alternatively, the network can signal the time threshold to UE 105.

According to some aspects, UE 105 can be configured to perform one or more of radio link monitoring (RLM), beam failure detection (BFD), or candidate beam detection (CBD) in system 100. In some examples, UE 105 can perform these operations on a channel associated with the serving cell (e.g., base station 101).

According to some examples, and considering RLM, UE 105 can use its physical layer to monitor downlink (DL) radio link quality and send the measurements to upper layers. UE 105 can use is medium access control (MAC) layer for BFD and recovering. Also, UE 105 can use its RRC layer to configure physical and/or MAC layers and perform radio link failure detection and/or RRC establishment (or reestablishment). According to some aspects, RLM can be done based on different radio link monitoring reference signal (RLM-RS) resources, as configured by the network (e.g., base station 101 and/or 103).

According to some aspects, UE 105 can perform RLM, BFD, and/or CBD during an evaluation time period corresponding to RLM, BFD, and/or CBD operations, respectively. In current TS 38.133, for FR2, UE 105 can be able to evaluate whether the downlink radio link quality on the configured RLM-RS resource estimated over a first evaluation time period ($T_{Evaluate\_out\_SSB}$ [ms]) becomes worse than a first threshold (e.g., $Q_{out\_SSB}$) within the first evaluation time period ($T_{Evaluate\_out\_SSB}$ [ms]). Similarly, UE 105 can be able to evaluate whether the downlink radio link quality on the configured RLM-RS resource estimated over a second evaluation time period ($T_{Evaluate\_in\_SSB}$ [ms]) becomes better than a second threshold (e.g., $Q_{in\_SSB}$) within the second evaluation time period ($T_{Evaluate\_in\_SSB}$ [MS]) with a scaling factor N=8. In this example, the first and second evaluation time periods can be determined for FR2 using Table 8.1.2.2-2 of TS 38.133, which is incorporated herein in its entirety.

Similarly, in current TS 38.133, for FR2, UE 105 can be able to evaluate whether the downlink radio link quality on the configured SSB resource in a set estimated over a third evaluation time period ($T_{Evaluate\_BFD\_SSB}$ [ms]) becomes worse than a third threshold (e.g., $Q_{out\_LR\_SSB}$) within the third evaluation time period ($T_{Evaluate\_BFD\_SSB}$ [ms]). In this example, the third evaluation time period can be determined for FR2 using Table 8.5.2.2-2 of TS 38.133, which is incorporated herein in its entirety.

Similarly, in current TS 38.133, for FR2, UE 105 can be able to evaluate whether the L1-RSRP measured on the configured SSB resource in a set estimated over a fourth evaluation time period ($T_{Evaluate\_CBD\_SSB}$ [ms]) becomes better than a fourth threshold (e.g., $Q_{in\_LR}$) within the fourth evaluation time period ($T_{Evaluate\_CBD\_SSB}$ [ms]). In this example, the fourth evaluation time period can be determined for FR2 using Table 8.5.5.2-2 of TS 38.133, which is incorporated herein in its entirety.

Some aspects of this disclosure are directed to the first, second, third, and fourth evaluation time periods (e.g., $T_{Evaluate\_out\_SSB}$ [MS], $T_{Evaluate\_in\_SSB}$ [MS], $T_{Evaluate\_BFD\_SSB}$ [ms], and $T_{Evaluate\_CBD\_SSB}$ [ms]) when the LBT failure occurs and/or when RX beam sweeping occurs.

According to some examples, when the LBT failure occurs and/or when RX beam sweeping occurs, the first evaluation time period for the RLM operation (e.g., $T_{Evaluate\_out\_SSB}$ [ms] now updated as $T_{Evaluate\_out\_SSB, CCA}$ [ms],) can be determined as follows:

$$T_{Evaluate\_out\_SSB,CCA} = \max(200, \text{Ceil}((10+Z1)*P*N)*T_{ssb}) \quad \text{Equation (8)}.$$

Here, $T_{ssb}$ is similar to $T_{ssb,RO}$ discussed above. N is RX beam scanning factor. P can be determined as discussed in TS 38.133, which is incorporated herein in its entirety. Also, Z1 is an integer that can be set to different values depending on, for example, different SSB Ês/Iot values.

In this example that the LBT failure and RX beam sweeping is considered, the second evaluation time period for the RLM operation (e.g., $T_{Evaluate\_in\_SSB}$ [ms] now updated as $T_{Evaluate\_in\_SSB, CCA}$ [ms],) can be determined using different options.

Option 1— The second evaluation time period can be determined as:

$$T_{Evaluate\_in\_SSB,CCA} = \max(100, \text{Ceil}((5+Z2)*P*N)*T_{ssb}) \quad \text{Equation (9)}.$$

Here, Z2 is an integer that can be obtained in the same manner as for SR1_intra (or SR1_inter). In some examples, an upper limit for Z2, denoted as Z2max can exist.

Option 2— The second evaluation time period can be determined as:

$$T_{Evaluate\_in\_SSB,CCA} = \max(100, (\text{Ceil}(5*P*N)+Z3)*T_{ssb}) \quad \text{Equation (10)}.$$

Here, Z3 is an integer that is no smaller than the number of RLM-RS SSB occasions, which are not available at UE 105 due to LBT failures at the base station during the second evaluation time period $T_{Evaluate\_in\_SSB, CCA}$.

According to some examples, for 60 GHz spectrum, N in Equations 9 and 10 may exceed 8.

According to some examples, evaluation time period for the RLM operation can be determined in similar manner as discussed above for no DRX (discontinuous reception), for DRX cycle less than or equal to 320 ms, and/or DRX cycle more than 320 ms.

According to some aspects, since the first and second evaluation time periods for RLM ($T_{Evaluate\_out\_SSB, CCA}$ and $T_{Evaluate\_in\_SSB, CCA}$) can be long due to one or more LBT failures, one or more RX beam sweepings, or the combination of LBT failure(s) and RX beam sweeping(s), one or more threshold for the time period between two successful SSB or CSI-RS measurements, which are closest in time domain, can be used. In one example, one time period threshold can be used during both first and second evaluation time periods of the RLM. In another example, a first evaluation time period threshold can be used during the first evaluation time period of the RLM and a second evaluation time period threshold can be used during the second evaluation time period of the RLM. The time period threshold can be used during the first and/or second evaluation time period between two closest successful measurements by UE 105. According to some examples, if the time period between a prior successful measurement and a current successful measurement exceeds the time period threshold, UE 105 will discard the prior successful measurement (and any successful measurements before that), and also reset the evaluation time period and restart calculating the evaluation time period. In some examples, the time period threshold can be provided in the specifications used by UE 105 and the network (e.g., base stations 101 and 103). Additionally, or alternatively, the network can signal the evaluation time period threshold to UE 105.

Although some aspects of this disclosure are discussed with respect to evaluation time period(s) of the RLM operation, similar analysis and determination can be applied to BFD and/or CBD operations.

For example, when the LBT failure occurs and/or when RX beam sweeping occurs, the third evaluation time period for the BFD operation (e.g., $T_{Evaluate\_BFD\_SSB}$ [ms] now updated as $T_{Evaluate\_BFD\_SSB,\ CCA}$ [ms],) can be determined as follows:

$$T_{Evaluate\_BFD\_SSB,CCA} = \max(200, \text{Ceil}((10+Z1)*P*N)*T_{ssb}) \quad \text{Equation (11)}.$$

As another example, when the LBT failure occurs and/or when RX beam sweeping occurs, the fourth evaluation time period for the CBD operation (e.g., $T_{Evaluate\_CBD\_SSB}$ [ms] now updated as $T_{Evaluate\_CBD\_SSB,\ CCA}$ [ms],) can be determined using different options.

Option 1— The fourth evaluation time period can be determined as:

$$T_{Evaluate\_CBD\_SSB,CCA} = \max(100, \text{Ceil}((5+Z2)*P*N)*T_{ssb}) \quad \text{Equation (12)}.$$

Option 2— The second evaluation time period can be determined as:

$$T_{Evaluate\_CBD\_SSB,CCA} = \max(100, (\text{Ceil}(5*P*N)+Z3)*T_{ssb}) \quad \text{Equation (13)}.$$

According to some aspects, since the third and fourth evaluation time periods for BFD and CBD ($T_{Evaluate\_BFD\_SSB,\ CCA}$ and $T_{Evaluate\_CBD\_SSB,\ CCA}$) can be long due to one or more LBT failures, one or more RX beam sweepings, or the combination of LBT failure(s) and RX beam sweeping(s), one or more threshold for the time period between two successful SSB or CSI-RS measurements, which are closest in time domain, can be used. In one example, one time period threshold can be used during both third and fourth evaluation time periods of the BFD and CBD. In another example, a third time period threshold can be used during the third evaluation time period of the BFD and a fourth time period threshold can be used during the fourth evaluation time period of the CBD. The time period threshold can be used for the third and/or fourth evaluation time period between two closest successful measurements by UE 105. According to some examples, if the time period between a prior successful measurement and a current successful measurement exceeds the time period threshold, UE 105 will discard the prior successful measurement (and any successful measurements before that), and also reset the evaluation time period and restart calculating the evaluation time period. In some examples, the evaluation time period threshold can be provided in the specifications used by UE 105 and the network (e.g., base stations 101 and 103). Additionally, or alternatively, the network can signal the evaluation time period threshold to UE 105.

Figure 2:
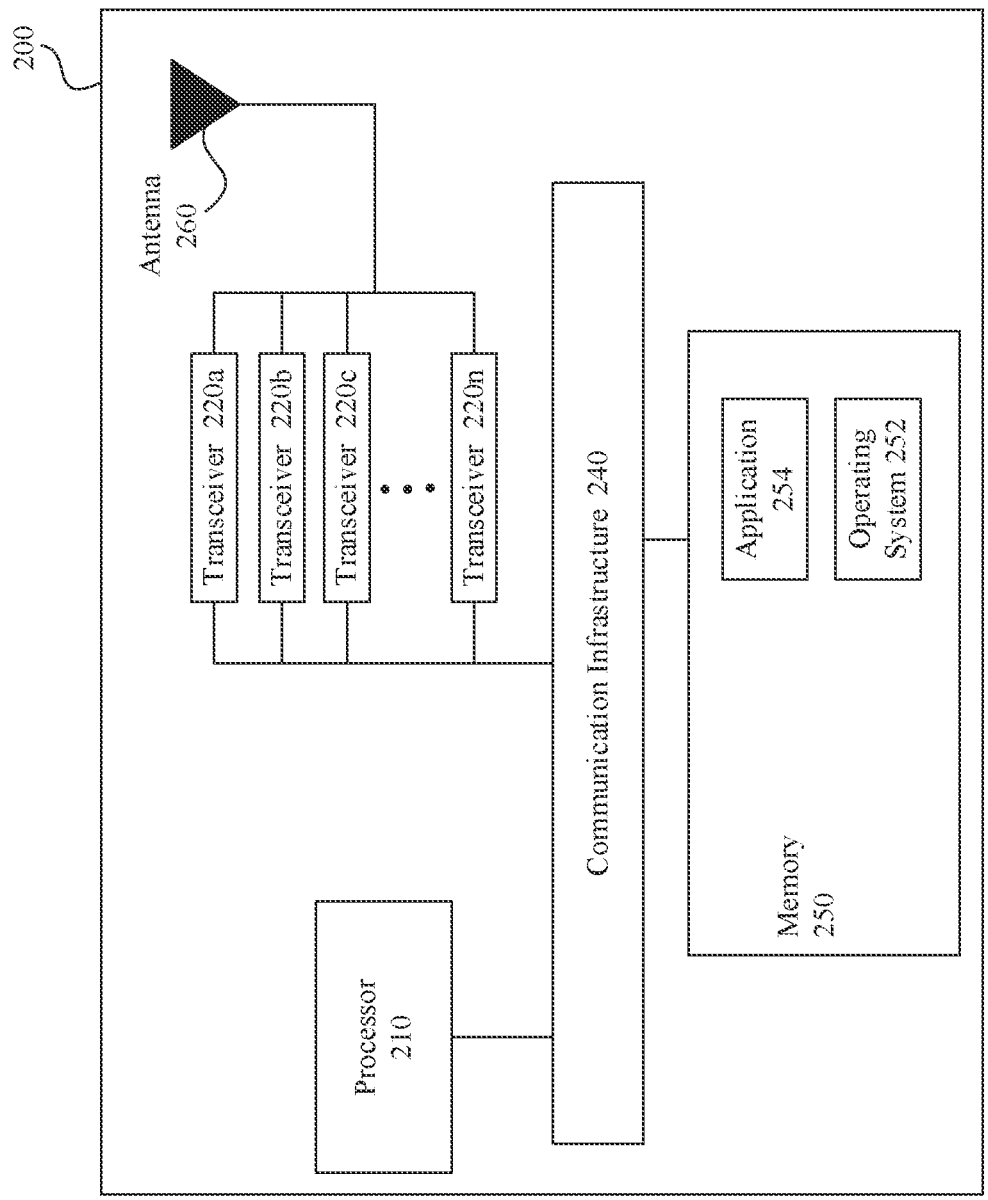
FIG. 2 illustrates a block diagram of an example system of an electronic device implementing mechanisms for performing handover, RLM, BFD, and CBD within the unlicensed spectrum when an LBT failure occurs and/or when a UE performs RX beam sweeping, according to some aspects of the disclosure.

FIG. 2 illustrates a block diagram of an example system 200 of an electronic device implementing mechanisms for performing handover, RLM, BFD, and CBD within the unlicensed spectrum when an LBT failure occurs and/or when a UE performs RX beam sweeping, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, audio call, video call, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for performing handover, RLM, BFD, and CBD within the unlicensed spectrum when an LBT failure occurs and/or when a UE performs RX beam sweeping, as described herein.

One or more transceivers 220a-220n transmit and receive communications signals that support mechanisms for performing handover, RLM, BFD, and CBD within the unlicensed spectrum when an LBT failure occurs and/or when a UE performs RX beam sweeping, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects, processor 210, alone or in combination with computer instructions stored within memory 250, and/or one or more transceiver 220a-220n, implements mechanisms for performing handover, RLM, BFD, and CBD within the unlicensed spectrum when an LBT failure occurs and/or when a UE performs RX beam sweeping, as discussed herein. For example, transceiver 220a can enable connection(s) and communication over a first carrier (for example, carrier 107 of FIG. 1). In this example, transceiver 220a and/or transceiver 220b can enable detecting and/or measuring a second carrier (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220a-220n, can implement these operations.

Figure 3:
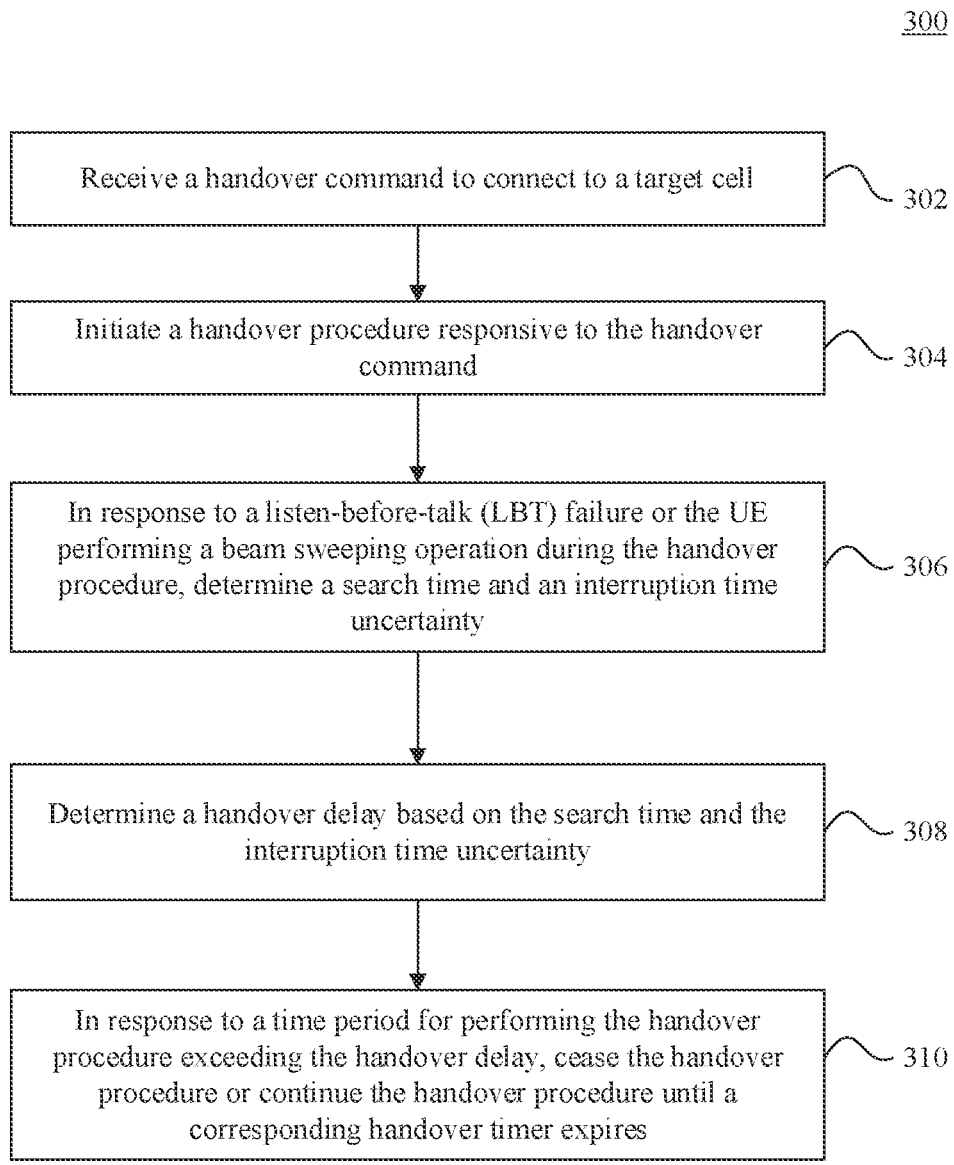
FIG. 3 illustrates an example method for a system (for example, a UE) supporting mechanisms for performing handover, RLM, BFD, and CBD within the unlicensed spectrum when an LBT failure occurs and/or when a UE performs RX beam sweeping, according to some aspects of the disclosure.

FIG. 3 illustrates example method 300 for a system (for example, a UE) supporting mechanisms for performing handover, RLM, BFD, and CBD within the unlicensed spectrum when an LBT failure occurs and/or when a UE performs RX beam sweeping, according to some aspects of the disclosure. As a convenience and not a limitation, FIG. 3 may be described with regard to elements of FIGS. 1-2. Method 300 may represent the operation of an electronic device (for example, UE 105 of FIG. 1) implementing mechanisms for performing handover, RLM, BFD, and CBD within the unlicensed spectrum when an LBT failure occurs and/or when a UE performs RX beam sweeping. Method 300 may also be performed by system 200 of FIG. 2 and/or computer system 500 of FIG. 5. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

At 302, a handover command is received. For example, UE 105 can receive a handover command from a serving cell (e.g., base station 101) to connect to a target cell (e.g., base station 103). Additionally, or alternatively, UE 105 can receive the handover command from the target cell (e.g., base station 103). At 304, in response to the handover command, a handover procedure is initiated. For example, UE 105 can start the handover procedure to connect to the target cell from the serving cell. As discussed above, operations 302 and 304 can be part of (or include) a UE initiated handover, a network initiated handover, an intra-frequency handover, and/or an inter-frequency handover.

At 306, it is determined whether a listen-before-talk (LBT) failure has occurred and/or if the UE is to perform a beam sweeping operation because of beam misalignment. For example, the UE (e.g., UE 105) determines that an LBT failure at the base station (e.g., base station 101) has occurred or the UE RX beam is not aligned with the base station TX beam (beam misalignment). According to some examples, the UE 105 can determine either the LBT failure at the base station has occurred or the RX beam is not aligned with the base station TX beam, when the UE cannot successfully detect an SSB transmitted by the base station. In another example, the UE (e.g., UE 105) is operating on an unlicensed spectrum and, as discussed above, the UE performs an LBT operation (e.g., using CCA) before using a channel. In some aspects, the UE can determine that an LBT failure has occurred if, for example, during the CCA operation the UE detects an energy on the channel that is higher than a threshold.

Also, according to some aspects, the UE can determine that it is to perform a beam sweeping operation when the UE detect the beam misalignment. In a non-limiting example, the UE can determine that it is to perform a beam sweeping operation if the UE does not know which beam the UE is to use to receive, for example, SSBs from the serving cell. By performing the beam sweeping operation, the UE can determine the "best" beam to use for receiving information and data from the serving cell.

During the handover procedure initiated by the handover command and in response to the LBT failure and/or the UE performing the beam sweeping operation, operation 306 can further include determining a search time and an interruption time uncertainty. In other words, if the UE determines that the LBT failure occurred and/or the UE is to perform the beam sweeping operation, the UE can determine a search time and an interruption time uncertainty as discussed above (for example, using Equations (2), (3), (4), or (5)).

For example, the search time can be determined based at least on (1) a number of SMTC occasions that are unavailable or (2) a number of SMTC occasions on which the UE did not detect any SSB during an intra-frequency detection period or an inter-frequency detection period. Additionally, or alternatively, the interruption time uncertainty can be determined based on (1) a number of consecutive SSBs to PRACH occasion association periods during which no PRACH occasion is available for PRACH transmission or (2) a number of consecutive PRACH occasions during which the UE cannot do PRACH transmission.

At 308, a handover delay is determined based on the search time and the interruption time uncertainty. For example, the UE can use the determined search time and interruption time uncertainty to determine the handover delay as discussed above, in for example, Equation (1).

At 310, the handover delay is used to determine whether to continue or cease the handover procedure. For example, the UE can measure and keep a time period for the handover procedure. In some examples, the time period for the handover procedure can start from the time the UE receives the handover command from the target cell. However, the aspects of this disclosure can include other times for starting the time period for the handover procedure based on the type of the handover. If the time period of the handover procedure exceeds the handover delay, then the UE can cease the handover procedure. In some examples, the UE can proactively cease the handover procedure for purposes such as power saving. Additionally, or alternatively, the UE can continue the handover procedure until a corresponding handover timer (e.g., T304) expires. In some examples, the UE will stop the handover procedure after the handover time expires and starts an RRC connection re-establishment procedure. Additionally, or alternatively, the UE can be further configured to reestablish a connection with the serving cell or establish a connection with the target cell or a third cell in response to the time period for performing the handover procedure exceeding the handover delay.

Method 300 can further include comparing a time period between two closest successful measurements during the search time to a time threshold. The time period between two closest successful measurements can include the time period between two successful SSB measurements and/or detections, which are closest in time domain (e.g., consecutive in time—no other successful measurements are between these two successful measurements). Method 300 can further include resetting the search time and re-determining the search time in response to the time period between two closest successful measurements exceeding the time threshold. For example, the UE can measure and store a time period between a prior successful measurement and a current successful measurement. The UE can determine whether the time period between the prior successful measurement and the current successful measurement exceeds the time threshold. If the time period between the prior successful measurement and the current successful measurement sample exceeds the time threshold, the UE can discard the prior measurements, and the UE resets the search time and restarts calculating the search time.

According to some aspects, the UE can operate on an unlicensed spectrum as part of frequency range 2 (FR2) in a 52.6 GHz to 71 GHz spectrum.

Although method 300 of FIG. 3 is discussed above with respect to a handover procedure, similar operations can be performed with respect to RLM, BFD, and CBD procedures. The RLM, BFD, and CBD procedures with consideration of LBT failure and/or RX beam sweeping can be performed in addition to, or in alternative to, the handover procedure.

Figure 4:
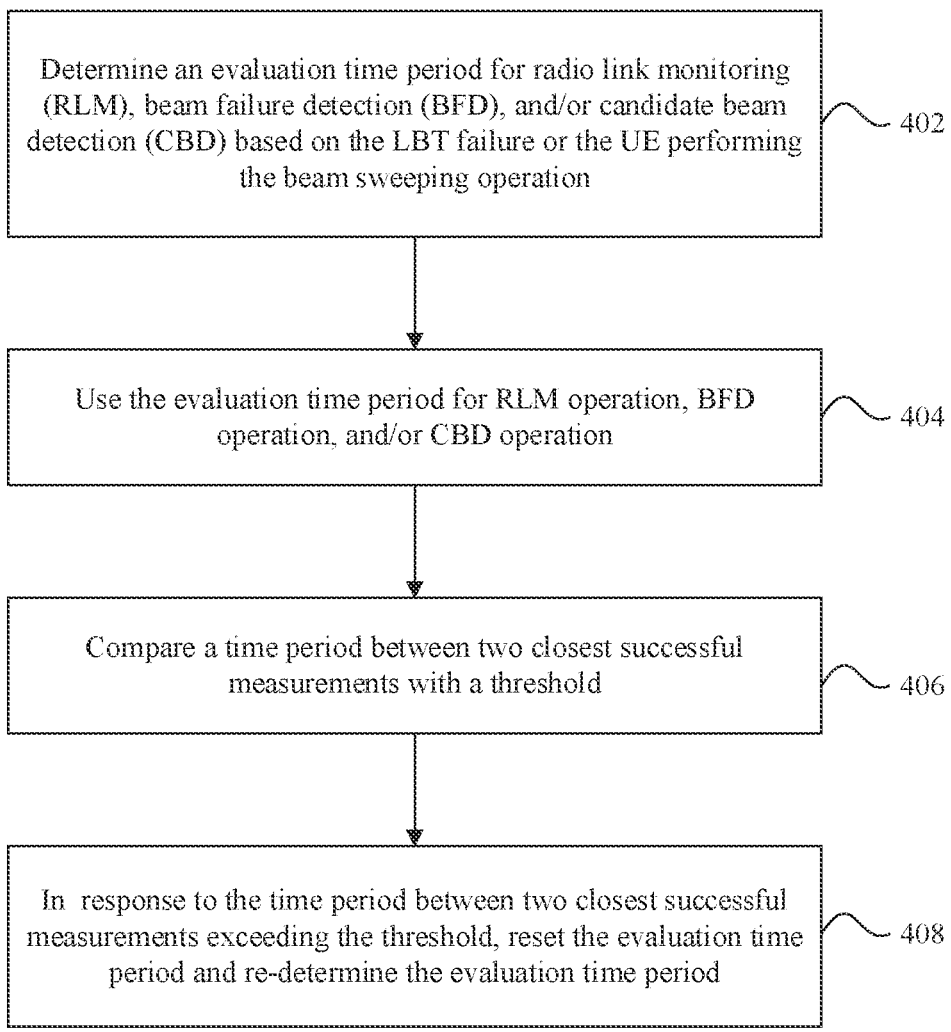
FIG. 4 illustrates another example method for a system (for example, a UE) supporting mechanisms for performing RLM, BFD, and CBD within the unlicensed spectrum when an LBT failure occurs and/or when a UE performs RX beam sweeping, according to some aspects of the disclosure.

FIG. 4 illustrates another example method 400 for a system (for example, a UE) supporting mechanisms for performing handover, RLM, BFD, and CBD within the unlicensed spectrum when an LBT failure occurs and/or when a UE performs RX beam sweeping, according to some aspects of the disclosure. As a convenience and not a limitation, FIG. 4 may be described with regard to elements of FIGS. 1-3. Method 400 may represent the operation of an electronic device (for example, UE 105 of FIG. 1) implementing mechanisms for performing handover, RLM, BFD, and CBD within the unlicensed spectrum when an LBT failure occurs and/or when a UE performs RX beam sweeping. Method 400 may also be performed by system 200 of FIG. 2 and/or computer system 500 of FIG. 5. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4. Method 400 can be performed in addition to, or in alternative to method 300 of FIG. 3.

At 402, an evaluation time period for radio link monitoring (RLM), beam failure detection (BFD), and/or candidate beam detection (CBD) is determined. For example, the UE (e.g., UE 105) can determine a first evaluation time period for RLM procedure, a second evaluation time period for BFD procedure, and/or a third evaluation time period for CBD procedure. According to some aspects, the first, second, and third evaluation time periods can be the same time period for two or more of the RLM, BFD, and CBD procedures. Alternatively, the first, second, and third evaluation time periods can be the different time periods for two or more of the RLM, BFD, and CBD procedures.

The UE determines these evaluation time periods based on the LBT failure or the UE performing the beam sweeping operation. For example, similar to operation 306 of FIG. 3, the UE determines whether an LBT failure has occurred and/or if the UE is to perform a beam sweeping operation. During the handover procedure initiated by the handover command and in response to the LBT failure or the UE performing the beam sweeping operation, the UE can determine the evaluation time period(s) for the RLM, BFD, and/or CBD procedures. As discussed above, the UE can determine the evaluation time period(s) for the RLM, BFD, and/or CBD procedures using Equations (8)-(13), according to some aspects.

At 404, the evaluation time period(s) are used for RLM, BFD, and/or CBD procedures. For example, when the UE performs one or more RLM, BFD, or CBD procedures, the UE uses the determined evaluation time period for the corresponding operation.

According to some aspects, the evaluation time periods can be used to determine whether to continue or cease the RLM, BFD, or CBD procedures. For example, the UE can measure and keep a time period for the RLM, BFD, or CBD procedures. If the time period for performing the RLM, BFD, or CBD procedures exceeds the evaluation time periods, then the UE can cease the RLM, BFD, or CBD procedures. Additionally, or alternatively, the UE can be further configured to restart the RLM, BFD, or CBD procedures in response to the time period between two closest successful measurements during the RLM, BFD, or CBD procedures exceeding the time period threshold(s).

In 406 and 408, the UE can reset the evaluation time period(s) if time period(s) between two closest successful measurements during the evaluation time period exceed one or more thresholds. For example, in 406, the time period between two closest successful measurements during the evaluation time period is compared to a threshold. In some examples, the time period between two closest successful measurements is the time period between two successful SSB or CSI-RS (channel state information reference signal) measurements and/or detections, which are closest in time domain. According to some aspects, the UE will have successful SSB measurements and/or detections when a base station (BS) transmits an SSB and BS SSB TX beam and UE RX beam are aligned. In some examples, the two successful measurements closest in time are two successful measurements consecutive in time (e.g., no other successful measurements are between these two successful measurements).

According to some aspects, the threshold(s) for the evaluation time period(s) can be the same threshold for two or more of the RLM, BFD, and CBD procedures. Alternatively, the threshold(s) for the evaluation time period(s) can be different thresholds for two or more of the RLM, BFD, and CBD procedures.

In 408 and in response to the time period between two closest successful measurements exceeding the threshold, the evaluation time period can be reset and be re-determined.

Figure 5:
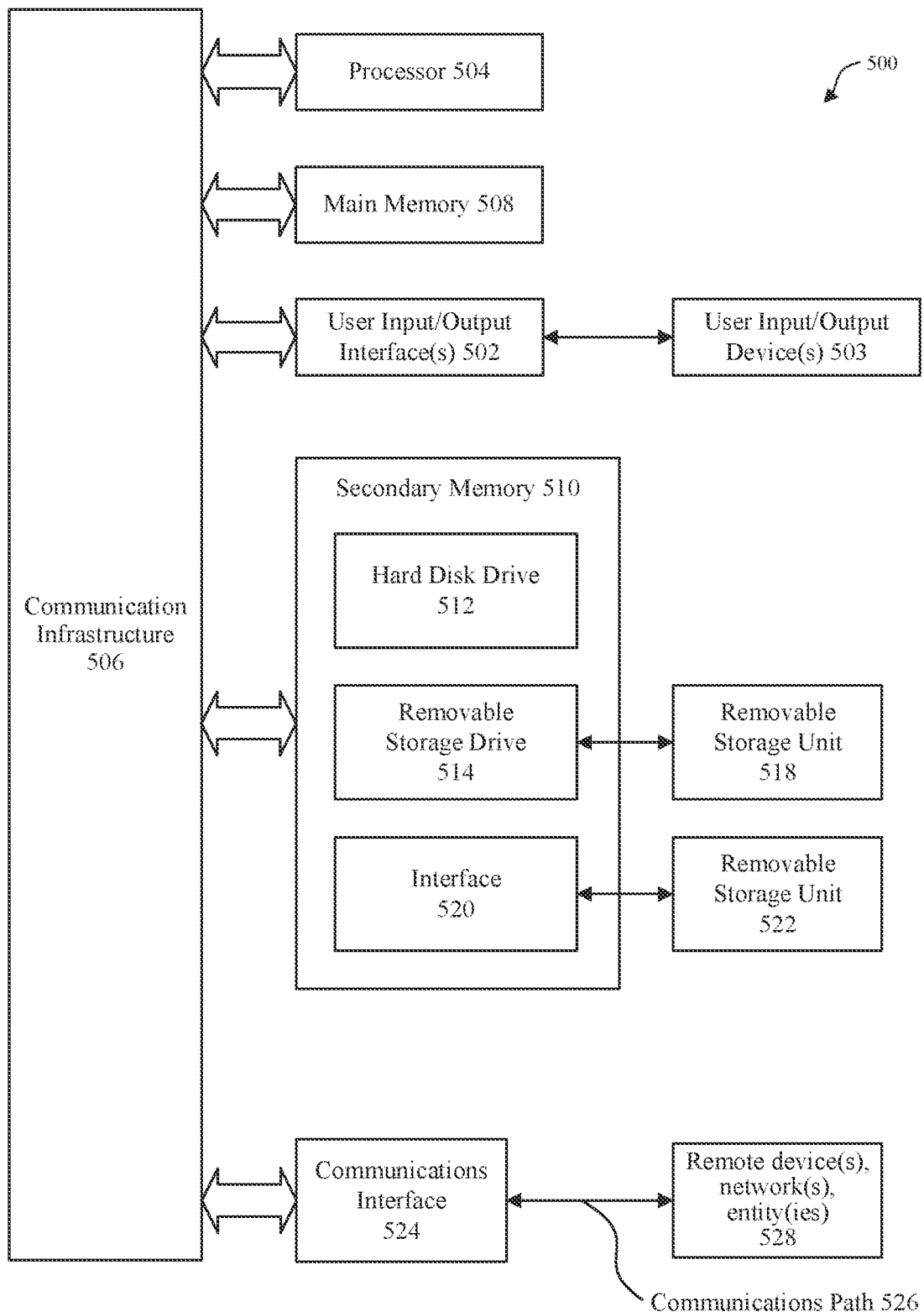
FIG. 5 is an example computer system for implementing some aspects or portion(s) thereof.

Various aspects can be implemented, for example, using one or more computer systems, such as computer system 500 shown in FIG. 5. Computer system 500 can be any well-known computer capable of performing the functions described herein such as devices 101, 105 of FIGS. 1 and/or 200 of FIG. 2. Computer system 500 includes one or more processors (also called central processing units, or CPUs), such as a processor 504. Processor 504 is connected to a communication infrastructure 506 (e.g., a bus.) Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
   a transceiver configured to wirelessly communicate with a serving cell; and
   a processor communicatively coupled to the transceiver and configured to:
   receive, using the transceiver, a handover command to connect to a target cell;
   initiate a handover procedure responsive to the handover command;
   in response to a listen-before-talk (LBT) failure or the UE performing a beam sweeping operation during the handover procedure, determine a search time and an interruption time uncertainty;
   determine a handover delay based on the search time and the interruption time uncertainty;
   in response to a time period for performing the handover procedure exceeding the handover delay, cease the handover procedure;
   determine an evaluation time period for radio link monitoring (RLM) based on the LBT failure or the UE performing the beam sweeping operation;
   use the evaluation time period for an RLM operation;
   compare a time period between two closest successful measurements to a threshold; and
   in response to the time period between two closest successful measurements exceeding the threshold, reset the evaluation time period and re-determine the evaluation time period.

2. The UE of claim 1, wherein the processor is further configured to reestablish a connection with the serving cell or establish a connection with the target cell or a third cell in response to the time period for performing the handover procedure exceeding the handover delay and wherein the transceiver is configured to operate on an unlicensed spectrum as part of frequency range 2 (FR2) in a 52.6 GHz to 71 GHz spectrum.

3. The UE of claim 1, wherein the processor is further configured to determine the search time based at least on (1) a number of synchronization signal block (SSB) based measurement timing configuration (SMTC) occasions being unavailable or (2) a number of SMTC occasions on which the UE did not detect any SSB during an intra-frequency detection period or an inter-frequency detection period.

4. The UE of claim 1, wherein the processor is further configured to determine the interruption time uncertainty based on (1) a number of consecutive synchronization signal blocks (SSBs) to physical random access channel (PRACH) occasion association periods during which no PRACH occasion is available for PRACH transmission or (2) a number of consecutive PRACH occasions during which the UE cannot do PRACH transmission.

5. The UE of claim 1, wherein the processor is further configured to:
   compare a second time period between two closest successful measurements during the search time to a time threshold; and
   in response to the second time period between two closest successful measurements exceeding the time threshold, reset the search time and re-determine the search time.

6. The UE of claim 1, wherein the processor is further configured to:
   determine a second evaluation time period for beam failure detection (BFD) based on the LBT failure or the UE performing the beam sweeping operation;
   use the second evaluation time period for a BFD operation;
   compare a second time period between two closest successful measurements to a second threshold; and
   in response to the second time period between two closest successful measurements exceeding the second threshold, reset the second evaluation time period and re-determine the second evaluation time period.

7. The UE of claim 1, wherein the processor is further configured to:
   determine a second evaluation time period for candidate beam detection (CBD) based on the LBT failure or the UE performing the beam sweeping operation;
   use the second evaluation time period for a CBD operation;
   compare a second time period between two closest successful measurements to a second threshold; and
   in response to the second time period between two closest successful measurements exceeding the second threshold, reset the second evaluation time period and re-determine the second evaluation time period.

8. The UE of claim 1, wherein the processor is configured to determine the search time for an unknown intra-frequency cell or for an unknown inter-frequency cell based at least on a number of measurement timing configuration (SMTC) occasions being either unavailable, or on which there has been no successful detection of any synchronization signal blocks (SSBs) at the UE due to a beam misalignment during an intra-frequency detection period or an inter-frequency detection period, respectively.

9. The UE of claim 1, wherein the processor is configured to determine the evaluation time period based at least on a number of rounds of receiving beam sweeping of the beam sweeping operation and a receiving beam factor.

10. A method, comprising:
receiving, by a user equipment (UE), a handover command to connect to a target cell;
initiating a handover procedure responsive to the handover command;
in response to a listen-before-talk (LBT) failure or the UE performing a beam sweeping operation during the handover procedure, determining a search time and an interruption time uncertainty;
determining a handover delay based on the search time and the interruption time uncertainty;
in response to a time period for performing the handover procedure exceeding the handover delay, ceasing the handover procedure;
determining an evaluation time period for radio link monitoring (RLM) based on the LBT failure or the UE performing the beam sweeping operation;
using the evaluation time period for an RLM operation;
comparing a time period between two closest successful measurements to a threshold; and
in response to the time period between two closest successful measurements exceeding the threshold, resetting the evaluation time period and re-determining the evaluation time period.

11. The method of claim 10, further comprising:
reestablishing a connection with a serving cell or establishing a connection with the target cell or a third cell in response to the time period for performing the handover procedure exceeding the handover delay.

12. The method of claim 10, wherein the determining the search time comprises determining the search time based at least on (1) a number of synchronization signal block (SSB) based measurement timing configuration (SMTC) occasions being unavailable or (2) a number of SMTC occasions on which the UE did not detect any SSB during an intra-frequency detection period or an inter-frequency detection period.

13. The method of claim 10, wherein the determining the interruption time uncertainty comprises determining the interruption time uncertainty based at least on (1) a number of consecutive synchronization signal blocks (SSBs) to physical random access channel (PRACH) occasion association periods during which no PRACH occasion is available for PRACH transmission or (2) a number of consecutive PRACH occasions during which the UE cannot do PRACH transmission.

14. The method of claim 10, further comprising:
determining a second evaluation time period for Beam Failure Detection (BFD) based on the LBT failure or the UE performing the beam sweeping operation;
using the second evaluation time period for a BFD operation;
comparing a second time period between two closest successful measurements to a second threshold; and
in response to the second time period between two closest successful measurements exceeding the second threshold, resetting the second evaluation time period and re-determining the second evaluation time period.

15. The method of claim 10, further comprising:
determining a second evaluation time period for Candidate Beam Detection (CBD) based on the LBT failure or the UE performing the beam sweeping operation;
using the second evaluation time period for a CBD operation;
comparing a second time period between two closest successful measurements to a second threshold; and
in response to the second time period between two closest successful measurements exceeding the second threshold, resetting the second evaluation time period and re-determining the second evaluation time period.

16. The method of claim 10, wherein determining the search time comprises determining the search time for an unknown intra-frequency cell or for an unknown inter-frequency cell based at least on a number of measurement timing configuration (SMTC) occasions being either unavailable, or on which there has been no successful detection of any synchronization signal blocks (SSBs) at the UE due to a beam misalignment during an intra-frequency detection period or an inter-frequency detection period, respectively.

17. The method of claim 10, wherein determining the evaluation time period comprises determining the evaluation time period based at least on a number of rounds of receiving beam sweeping of the beam sweeping operation and a receiving beam factor.

18. A non-transitory computer-readable medium storing instructions, when the instructions are executed by a processor of a user equipment (UE), the instructions cause the processor to perform operations, comprising:
receiving a handover command to connect to a target cell;
initiating a handover procedure responsive to the handover command;
in response to a listen-before-talk (LBT) failure or the UE performing a beam sweeping operation during the handover procedure, determining a search time and an interruption time uncertainty;
determining a handover delay based on the search time and the interruption time uncertainty;
in response to a time period for performing the handover procedure exceeding the handover delay, ceasing the handover procedure or continuing the handover procedure until a corresponding handover timer expires;
determining an evaluation time period for radio link monitoring (RLM) based on the LBT failure or the UE performing the beam sweeping operation;
using the evaluation time period for an RLM operation;
comparing a time period between two closest successful measurements to a threshold; and
in response to the time period between two closest successful measurements exceeding the threshold, resetting the evaluation time period and re-determining the evaluation time period.

19. The non-transitory computer-readable medium of claim 18, wherein the determining the search time comprises determining the search time based at least on (1) a number of synchronization signal block (SSB) based measurement timing configuration (SMTC) occasions being unavailable or (2) a number of SMTC occasions on which the UE did not detect any SSB during an intra-frequency detection period or an inter-frequency detection period.

20. The non-transitory computer-readable medium of claim 18, wherein:
determining the search time comprises determining the search time for an unknown intra-frequency cell or for an unknown inter-frequency cell based at least on a number of measurement timing configuration (SMTC) occasions being either unavailable, or on which there has been no successful detection of any synchronization signal blocks (SSBs) at the UE due to a beam misalignment during an intra-frequency detection period or an inter-frequency detection period, respectively, or determining the evaluation time period comprises determining the evaluation time period based at least on a number of rounds of receiving beam sweeping of the beam sweeping operation and a receiving beam factor.

* * * * *